United States Patent
Reddy

(10) Patent No.: US 6,195,079 B1
(45) Date of Patent: Feb. 27, 2001

(54) ON-SCREEN USER INTERFACE FOR A VIDEO ADAPTER CIRCUIT

(75) Inventor: Chandra S. Reddy, Cupertino, CA (US)

(73) Assignee: Sage, Inc., Santa Clara, CA (US)

( * ) Notice: Subject to any disclaimer, the term of this patent is extended or adjusted under 35 U.S.C. 154(b) by 0 days.

(21) Appl. No.: 08/948,684

(22) Filed: Oct. 10, 1997

Related U.S. Application Data

(60) Provisional application No. 60/031,133, filed on Nov. 18, 1996.

(51) Int. Cl.[7] .............................. G09G 5/34; G09G 5/00; G09G 5/08; H04N 5/50

(52) U.S. Cl. .......................... 345/121; 345/127; 345/146; 348/569

(58) Field of Search ...................................... 345/121, 127, 345/146, 352–353; 348/445, 511, 563, 564, 569, 570, 572–580

(56) References Cited

U.S. PATENT DOCUMENTS

| | | | |
|---|---|---|---|
| 4,918,523 | 4/1990 | Simon et al. | 358/133 |
| 5,079,630 | 1/1992 | Golin et al. | 358/133 |
| 5,111,190 | 5/1992 | Zenda | 340/717 |
| 5,122,873 | 6/1992 | Golin | 358/133 |
| 5,166,779 | * 11/1992 | Moyer | 358/10 |
| 5,225,904 | 7/1993 | Golin et al. | 358/133 |
| 5,243,433 | 9/1993 | Hailey | 358/214 |
| 5,398,071 | 3/1995 | Gove et al. | 348/558 |
| 5,493,317 | 2/1996 | Kim | 345/213 |
| 5,550,556 | 8/1996 | Wu et al. | 345/14 |
| 5,550,566 | 8/1996 | Hodgson et al. | 345/202 |

(List continued on next page.)

FOREIGN PATENT DOCUMENTS

| | | | |
|---|---|---|---|
| 0 456 165 A2 | 11/1991 | (EP) | G09G/1/16 |
| 0 519 744 A2 | 12/1992 | (EP) | G09G/3/36 |
| 0 364 307 A2 | 4/1994 | (EP) | G09G/3/36 |
| 0 622 775 A1 | 11/1994 | (EP) | G09G/5/18 |
| WO 93 15497 | 8/1993 | (WO) | G09G/3/20 |

*Primary Examiner*—Richard A. Hjerpe
*Assistant Examiner*—Duc Dinh
(74) *Attorney, Agent, or Firm*—Haverstock & Owens LLP

(57) ABSTRACT

A video adapter circuit for adapting analog video signals provided by a personal computer system designed to drive a CRT display monitor into signals appropriate for driving a flat panel display monitor. The video adapter circuit accepts analog video and synchronizing signals in any one of several scanning formats commonly utilized in personal computer systems and automatically detects the scanning format of the signals. An oscillator generates a clock signal that is synchronized with the HSYNC signal generated by the personal computer system. Each of the analog RGB video signals are amplified by a video amplifier and sampled, according to the clock signal, by a analog-to-digital converter. A controller circuit compresses the sampled video signals and stores the compressed data in a dual-port video frame memory at a rate determined by the scanning format. The compressed data is retrieved and decompressed from the video frame memory at a rate determined by the requirements of the flat panel display monitor and converted into a format appropriate for driving the flat panel display monitor. If the received video signals have a resolution that is lower than the resolution provided by the flat panel display monitor, the video adapter circuit automatically expands the image to fill the entire image area of the flat panel display monitor. An on-screen menu provides a user interface for the video adapter circuit, including an ability to adjust the brightness and contrast ratio of the image displayed on the flat panel display monitor by adjusting the dc level and the gain of the video amplifier. In addition, the horizontal and vertical position of the displayed image can be adjusted.

11 Claims, 8 Drawing Sheets

U.S. PATENT DOCUMENTS

| | | | |
|---|---|---|---|
| 5,555,002 | * | 9/1996 | Nguyen ................................. 345/121 |
| 5,627,564 | * | 5/1997 | Yang ..................................... 345/146 |
| 5,703,661 | * | 12/1997 | Wu ........................................ 348/673 |
| 5,767,916 | | 6/1998 | West ..................................... 348/537 |
| 5,774,187 | * | 6/1998 | Tsunoda ............................... 348/533 |
| 5,786,863 | | 7/1998 | Collins ................................. 348/458 |
| 5,790,096 | | 8/1998 | Hill, Jr. ................................ 345/150 |
| 5,926,174 | * | 7/1999 | Shibamiya et al. .................. 345/213 |

\* cited by examiner

ON-SCREEN USER INTERFACE FOR A VIDEO ADAPTER CIRCUIT

RELATED APPLICATION

This application claims priority under 35 U.S.C. § 119(e) based on U.S. provisional application Ser. No. 60/031,133, filed Nov. 18, 1996, and entitled "Adapter Circuit for a Flat Panel Display Monitor." This application is related to U.S. patent application Ser. No. 08/948,827, filed Oct. 10, 1997, and entitled "Video Adapter Circuit For Conversion of an Analog Video Signal to a Digital Display Image," and U.S. patent application Ser. No. 08/948,787, filed Oct. 10, 1997, and entitled "Video Adapter Circuit For Detection of Analog Video Scanning Formats," now U.S. Pat. No. 5,953,074, issued Sep. 14, 1999 each of which is herein incorporated by reference.

FIELD OF THE INVENTION

The invention relates to the field of adapter circuits for flat panel display monitors. More particularly, the invention relates to adjustment of display parameters, such as brightness and contrast, using an on-screen user interface for the flat panel display monitor.

BACKGROUND OF THE INVENTION

For displaying graphic images on a cathode ray tube display monitor, personal computer systems generally include a video adapter circuit board housed within the computer system case. The video adapter circuit board typically includes a bus interface circuit, a dedicated processor, dual-port random access memory (VRAM), and a digital-to-analog converter. The video adapter circuit board is typically controlled by the central processing unit (CPU) of the computer system and receives digital data representative of an image to be displayed from the computer system memory or from an input device coupled to the computer system bus.

Typically, video adapter circuit boards generate red, green and blue (RGB) analog component video signals in addition to horizontal (HSYNC) and vertical (VSYNC) synchronizing signals. These signals are generally formatted according to a selected one of several commonly utilized computer scanning formats. These formats determine the resolution of the video image and include video graphics array (VGA), super video graphics array (SVGA), color graphics adapter (CGA), extended graphics adapter (EGA), and extended graphics array (XGA) formats. A cathode ray tube (CRT) adapted to the selected scanning format receives the analog RGB component video signals and synchronizing signals and provides a display of the image.

Due to concerted efforts of display manufacturers, flat panel display monitors are becoming increasingly available. Flat panel display monitors offer several advantages over CRT display monitors. For example, flat panel display monitors are typically lighter in weight, occupy less space, consume less power, emit less radiation and have less glare than do their CRT counterparts. Commercially available flat panel display monitors are commonly liquid crystal displays that utilize active-matrix addressing. These include thin film transistor (TFT) and supertwisted-nematic (STN) flat panel display monitors.

TFT and STN flat panel display monitors operate on markedly different principles than do CRT display monitors and, therefore, require distinctly different driving signals. TFT and STN flat panel display monitors utilize the optical properties of liquid crystal which are different when measured in a direction parallel to the axis of the crystals in comparison to when measured in a direction perpendicular to the axis of the crystals. Liquid crystal is sandwiched between two polarizing filters having polarizing directions oriented 90 degrees apart. The inside surface of the display adjacent to the liquid crystal is treated to cause the liquid crystals to align such that they appear transparent. When an electric field is applied to an area of the display, liquid crystals in that area are reoriented by the electric field such that they appear opaque. By adding a backlight and color filters, a color image can be displayed. In active matrix displays, a transistor is dedicated to control the electric field for each pixel. TFT displays are characterized in that under an applied electric field, the crystals are reoriented by twisting up to 90 degrees. In an STN display, the crystals are reoriented by twisting up to 270 degrees under the applied electric field. STN displays generally have higher contrast and greater viewing angles that TFT displays.

Because a CRT accepts RGB signals, whereas a flat panel display accepts signals utilizing a digital protocol, these devices cannot merely be interchanged in a computer system. Rather, the computer must typically be disassembled and appropriate video card drivers are exchanged. It is anticipated, however, that a user of an existing personal computer system will wish to utilize a flat panel display monitor with the personal computer system that is configured for a CRT. It is further anticipated that such a user will be discouraged from so doing if hardware and/or software modifications to the personal computer are required or if considerable technical knowledge is required on the part of the user.

Therefore, what is needed is a circuit for adapting a personal computer system for driving a flat panel display monitor without requiring modification of the personal computer system hardware or software. Further, what is needed is a circuit that can determine the scanning format of analog RGB signals generated by a personal computer and, based upon the determination, convert the analog RGB signals into signals appropriate to driving a flat panel display monitor. What is also needed is an ability to adjust display parameters for the flat panel display monitor, such as brightness and contrast, without requiring modification of the personal computer system.

SUMMARY OF THE INVENTION

The invention is a video adapter circuit for adapting analog video signals provided by a personal computer system designed to drive a CRT display monitor into signals appropriate for driving a flat panel display monitor. The video adapter circuit accepts analog video and synchronizing signals in any one of several scanning formats commonly utilized in personal computer systems and automatically detects the scanning format of the signals.

An oscillator generates a clock signal that is synchronized with the HSYNC signal generated by the personal computer system. Each of the analog RGB video signals are amplified by a video amplifier and sampled, according to the clock signal, by an analog-to-digital converter. A controller circuit compresses the sampled video signals and stores the compressed data in a dual-port video frame memory at a rate determined by the scanning format. The compressed data is retrieved and decompressed from the video frame memory at a rate determined by the requirements of the flat panel display monitor and converted into a format appropriate for driving the flat panel display monitor. If the received video signals have a resolution that is lower than the resolution provided by the flat panel display monitor, the video adapter circuit automatically expands the image to fill the entire image area of the flat panel display monitor.

An on-screen menu provides a user interface for the video adapter circuit, including an ability to adjust the brightness and contrast ratio of the image displayed on the flat panel display monitor by adjusting the dc level and the gain of the video amplifier. In addition, the horizontal and vertical position of the displayed image can be adjusted.

DETAILED DESCRIPTION OF THE PREFERRED EMBODIMENTS

Figure 1:
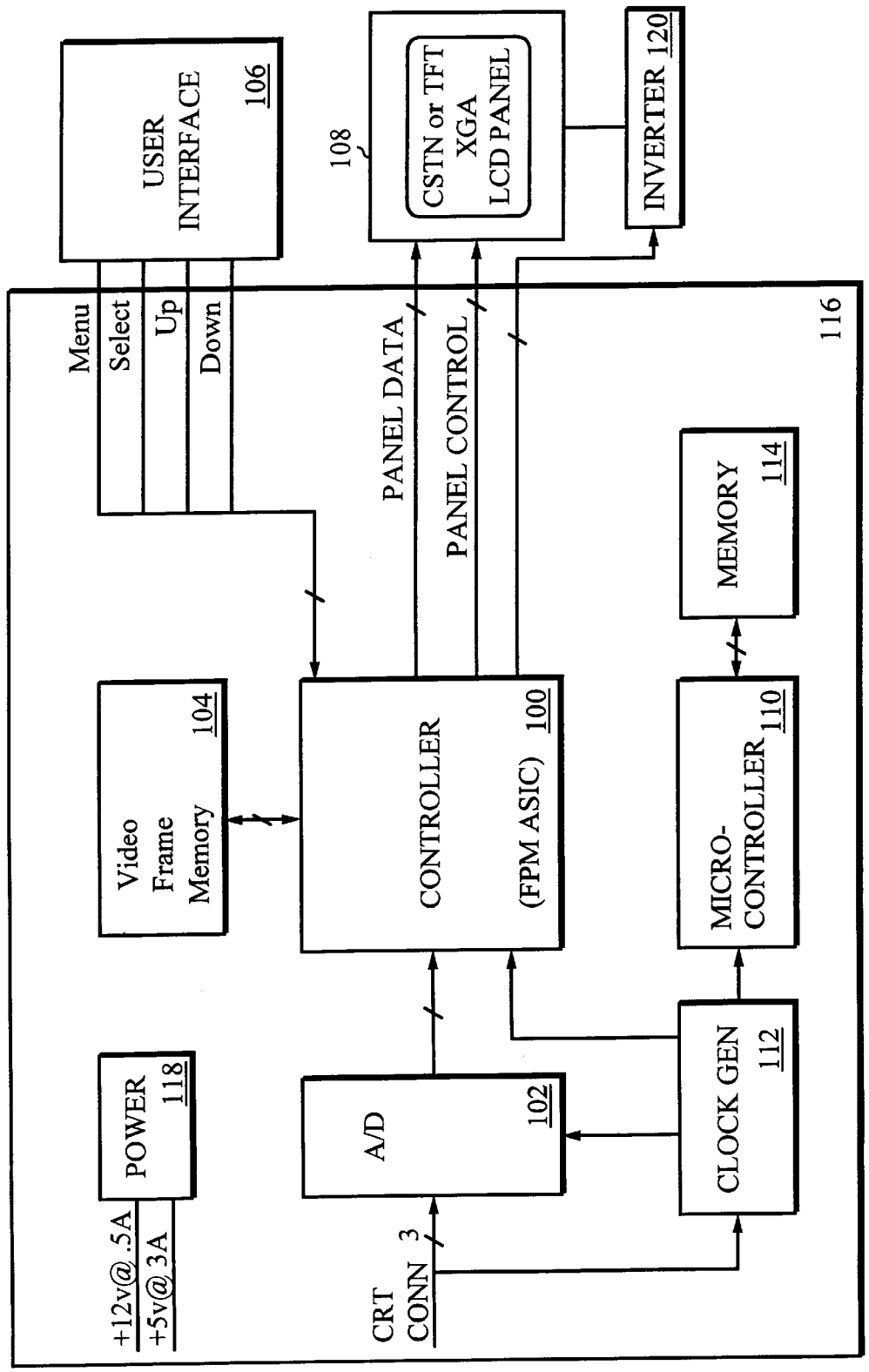
FIG. 1 illustrates a block schematic diagram of the flat panel display video adapter of the present invention.

FIG. 1 illustrates a block schematic diagram of the flat panel display video adapter of the present invention. An integrated circuit controller 100 is coupled to an analog-to-digital converter 102, to a video frame memory 104, to a user interface 106, to a flat panel display monitor 108, to a micro controller 110 and to a clock generator 112. A memory 114 is coupled to the micro controller 110. Preferably, the controller 100, the analog-to-digital converter 102, the video frame memory 104, the micro controller 110, the clock generator 112 and the memory 114 are mounted to a printed circuit board 116. The printed circuit board 116 also includes a power supply 118 for providing power to the circuits coupled to the printed circuit board 116. Operation of the video adapter of the present invention is primarily controlled by the controller 100. Preferably, the controller 100 is an application specific integrated circuit (ASIC), but could be another controller, such as a general purpose processor that operates according to a stored software program.

A variety of flat panel display monitors are commercially available having a variety of different characteristics, pixel formats and signal requirements. Therefore, the video adapter of the present invention includes an ability to easily adapt to these various flat panel displays. In addition, communication with the host computer preferably conforms to one of the DDC (Display Data Channels) standard interface protocols. CRT display monitors typically operate according to one of several standardized interface protocols specified by the Video Electronics Standards Association (VESA) for communicating between the host computer and the display monitor. Data stored in non-volatile memory in a conventional CRT is read by the host computer so that the host computer can provide appropriate video signals to the CRT. The present invention provides this data to the host computer so that the presence of the present invention will be transparent to the host computer. This eliminates the need to alter the software or hardware of the host computer. Preferably, the invention provides data according to the DDC1, the DDC2 or the DDC2B protcol.

In addition, a backlight inverter 120 is provided if required by the particular flat panel display 108. The backlight inverter 120 provides power for an illumination source, such as a fluorescent lamp, located behind the display screen of the liquid crystal display monitor 108.

The micro controller 110 is preferably a 8031 microprocessor having an internal clock frequency of 12 Mhz. The memory 114 stores code and operational parameters for the controller 100. Preferably, the code is stored as firmware in an erasable programmable memory, such as EPROM, and the operational parameters are stored in random access memory (RAM), such as non-volatile random access memory (NVRAM), though other types of memory can be used. Upon start-up, the micro controller 110 initializes registers of the controller 100 with parameters, such as timing parameters and register parameters relevant to the type and speed of the frame memory 104 utilized. The registers of the controller 100 can also be programmed differently depending upon the scan format of the received video signals and upon the particular requirements of the flat panel display monitor 108.

In accordance with the VESA Display Power Management System (DPMS) standard and based upon the HSYNC and VSYNC signals, the mode detect logic 316 sets appropriate bits in a power management control register PMR1 of the controller 100 while the micro controller 110 sets appropriate bits in a power management status register PMR2 of the controller 100 based upon the HSYNC and VSYNC signals detected by the mode detect logic 316. The DPMS standard specifies different modes of power management for the display 108: ON (normal operation), SUSPEND (turns off display and backlight, places display video memory in standby mode and turn off clocks), STANDBY (turns off backlight) and OFF. These modes are indicated by the HSYNC and VSYNC signals. The controller detects the absence of the HSYNC signal, the absence of the VSYNC signal, or the absence of both, to appropriately set the bits in the registers PMR1 and PMR2. If HSYNC and VSYNC are both present, then the display 108 is placed in the ON mode. If the HSYNC signal is absent, the display 108 is placed in the STANDBY mode. If the VSYNC signal is absent, the display 108 is placed in the SUSPEND mode. If both the HSYNC and VSYNC are absent, then the display is placed in the OFF mode. Accordingly, the mode detection logic 316 is always active. The micro controller 110 polls the power management status registers PMR1 and PMR2 and disables the clock signal CLOCK to the controller 100 when appropriate by writing into the power management register of the controller.

VIDEO CAPTURE

Figure 2:
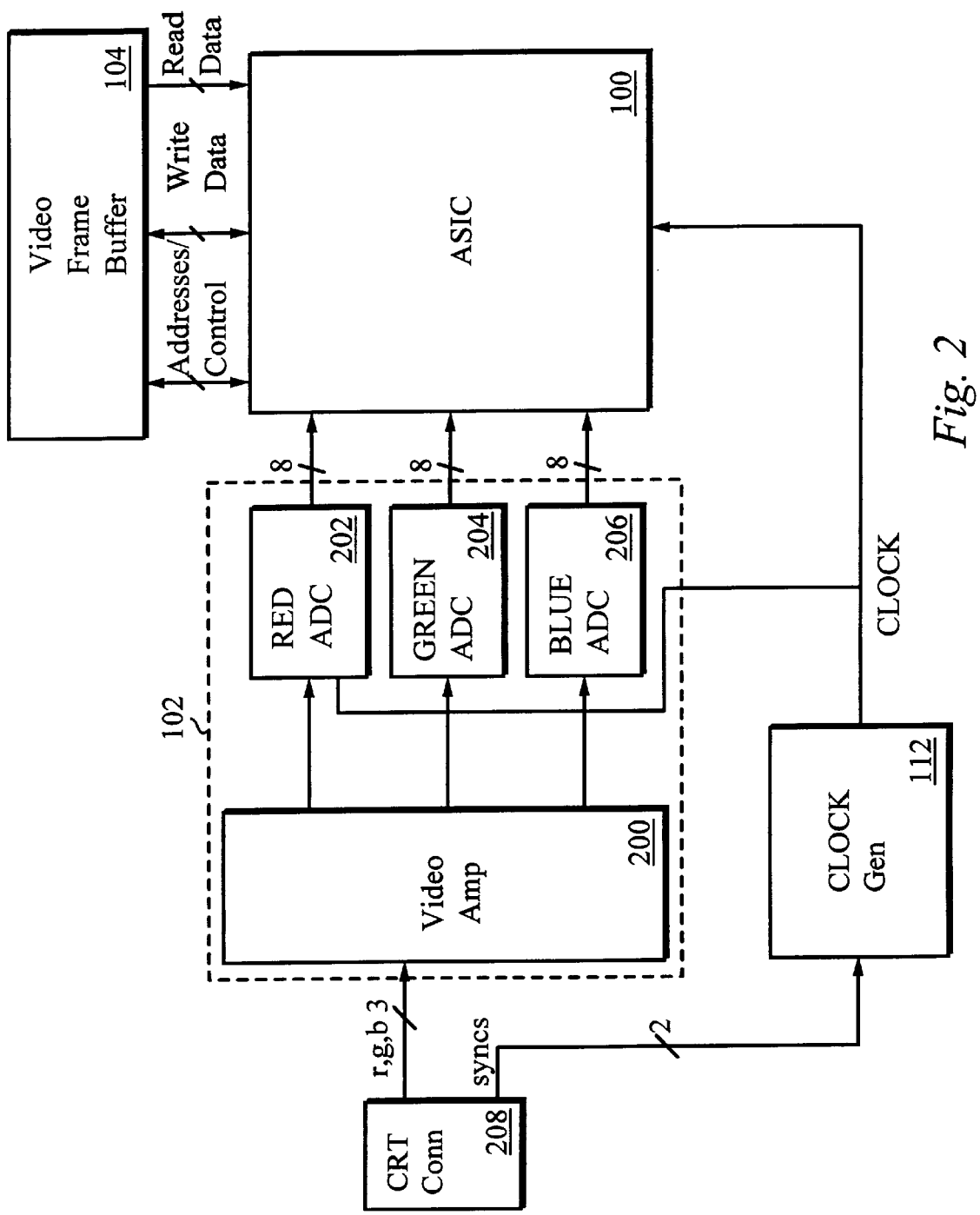
FIG. 2 illustrates a block schematic diagram of the analog-to-digital converter and video frame memory.

FIG. 2 illustrates a block schematic diagram of the analog-to-digital converter 102 and video frame memory 104 illustrated in FIG. 1. The analog-to-digital converter 102 includes a video amplifier 200 and three analog-to-digital converters 202, 204, and 206. The video amplifier 200 is coupled to receive video signals from a video output port of a personal computer system. For this purpose, a connector 208 is provided that is compatible with commonly used CRT cabling. The connector 208 receives analog red, green and blue (RGB) video signals as well as separate horizontal sync (HSYNC) and vertical sync (VSYNC) signals from the personal computer system. The signals can conform to scanning formats utilized in personal computer systems, such as VGA, SVGA, CGA, EGA or XGA. Alternately, the connector 208 can be configured to receive other video formats, such as NTSC or PAL composite video signals. The connector 208 also preferably provides a serial bus connection to the computer system so that the personal computer system can receive identification data, manufacturing data, or other data from the video adapter circuit.

The red, green and blue component signals are each amplified by a video amplifier circuit 200. The amplified red component signal is digitally sampled by the analog-to-digital converter 202; the amplified green component signal is digitally sampled by the analog-to-digital converter 204; and the amplified blue component signal is digitally sampled by the analog-to-digital converter 206. Each of the three analog-to-digital converters is preferably a high-speed 8-bit converter. Therefore, each sample of all three analog RGB component signals is a 24 bit sample. Alternately, the analog-to-digital converters 202, 204 and 206, can be integrated into a single, three channel, analog-to-digital converter. The dc offset and gain of the video amplifier 200 are preferably adjustable by the user through the user interface 106. This allows the user to adjust the brightness and contrast of the displayed image.

The clock generator 112 is coupled to receive the HSYNC and VSYNC signals from the connector 208. A phase locked loop included in the clock generator 112 locks to the frequency of the HSYNC signal for generating a clock signal CLOCK that is synchronous with the HSYNC signal, but which has a higher frequency. The frequency of the clock signal CLOCK preferably changes with the detected format of the RGB video received from the computer system to correspond with the resolution of the RGB video, i.e. the pixel rate. This frequency is in the range of 25 Mhz to 70 Mhz. The clock signal CLOCK provides sampling intervals to the analog-to-digital converters 202, 204 and 206. In addition, the clock signal CLOCK is utilized by the controller 100 for controlling latching of the digitized data.

The video frame memory 104 serves as a frame buffer for temporarily storing the digitized and compressed video data and can be implemented with DRAM or SRAM, but is preferably implemented with dual-port VRAM for improved performance and display quality. Because dual-port memory is utilized in the video frame memory 104, data can be written into the frame memory 104 through a first port, WRITE DATA, while data can be simultaneously read out of the memory through a second port, READ DATA. Therefore, the digitized data can be written into the video frame memory 104 at the rate at which the controller 100 receives the data and can be read out of the video frame memory 104 at a rate determined by the requirements of the flat panel display 108. As an example, digital data derived from the analog RGB component video signals is typically written into the video frame memory 104 at a frame rate of 60–85 Hz, while the flat panel display 108 typically requires refreshing at a frame rate of 70–120 Hz. For STN flat panel displays, the controller 100 preferably refreshes the flat panel display 108 at an even higher rate to obtain a display image that is free from flicker. Preferably, the frame refresh rate for an STN panel is twice the rate at which the frames are written into the video frame memory 104.

Figure 3:
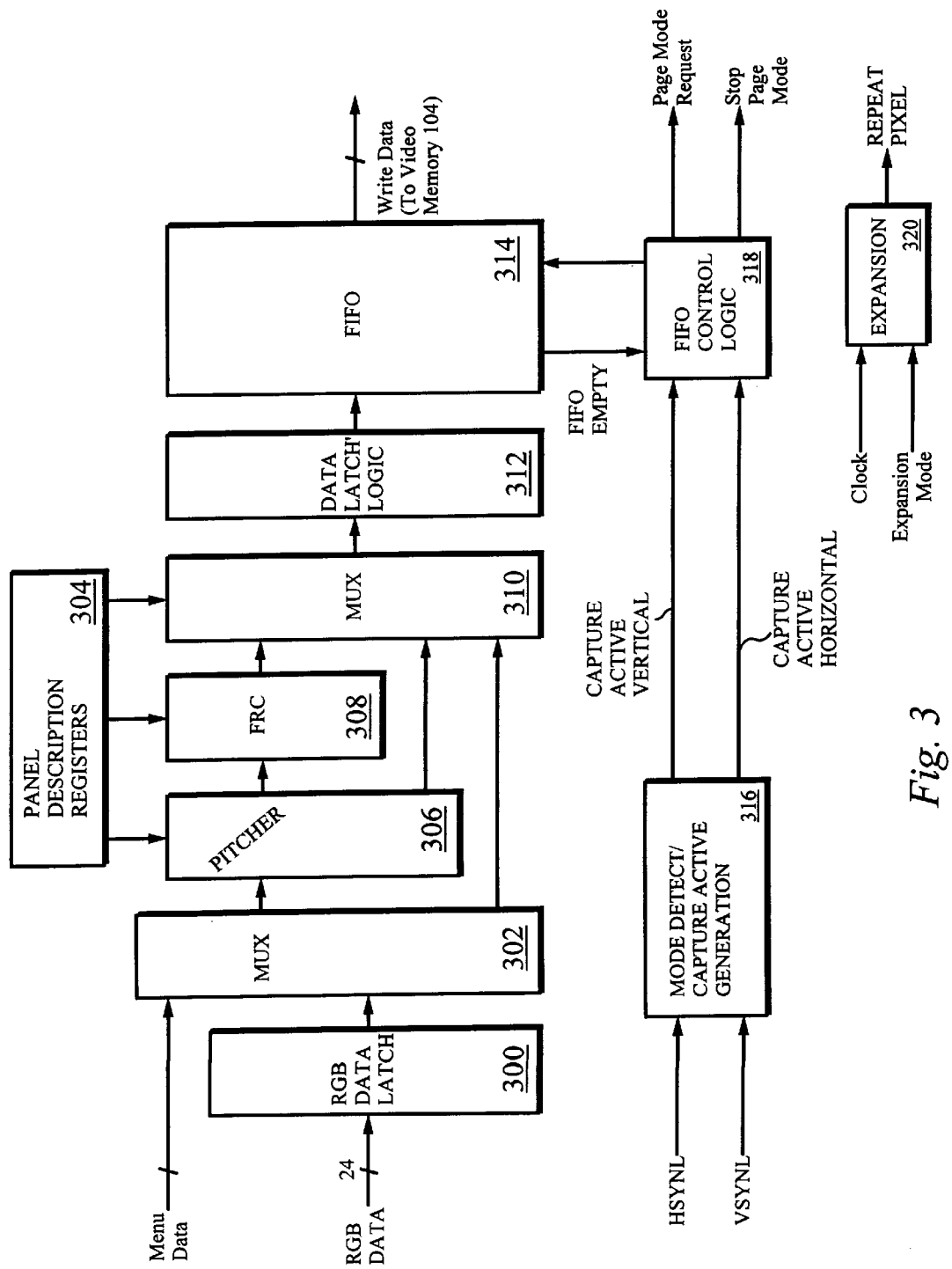
FIG. 3 illustrates a block schematic diagram of the capture engine of the controller.

FIG. 3 illustrates a block schematic diagram of the capture engine of the controller 100. The outputs of the analog-to-digital converters 202, 204, and 206 (FIG. 2) are coupled to an RGB data latch 300 (FIG. 3) for temporarily storing the digitized data. The controller 100 includes an on-screen menu display function which is described in more detail herein. Under control of logic circuits associated with the on-screen menu display function, a multiplexer 302 selects RGB data from the RGB data latch 300 or selects menu data to be displayed.

The controller 100 reads manufacturing data stored according to one of the DDC standards in a non-volatile memory of the display monitor 108 for programming the plurality of panel description registers 304 with parameters unique to a particular flat panel display monitor 108. These parameters determine whether the digitized data is routed directly to a data latch/logic 312 from the multiplexer 302 or whether the digitized data is first processed by a dither circuit 306 and/or an FRC circuit 308 before being routed to the data latch/logic 312. From the data latch/logic 312, the data is written into a FIFO logic 314. The FIFO logic 314 is coupled to provide data to the video frame memory 104.

According to one conventional implementation of color in video displays, 24 bits of data are used to represent color of a single pixel, 8 bits for red, 8 bits for green and 8 bits for blue. In prior art systems, all 24 bits are stored in video memory such as VRAM and then applied to the appropriate pixel to create the correct pixel image. Because all 24 bits of data for each pixel are stored, there is a significant requirement for memory to store a signal frame of data. Well known techniques are then conventionally used to reduce the data actually transferred to the display and/or to increase available image color presentation such as dither and frame rate control (FRC).

The present invention substantially reduces the memory requirements for a flat panel system. As shown in FIG. 3, the circuit of the present invention receives 24 bits of RGB color data for a pixel. In contrast to the prior art, before any data is stored the present circuit uses a dither circuit 306 to perform a dither operation on the color data bits to reduce the requirement for the number of bits necessary to form the desired image. The output of the dither circuit 306 is coupled to an FRC circuit 308 which then performs an FRC operation on this reduced number of bits to further reduce the necessary number of bits. This technique can result in an 8-to-1 data compression so that only 3 bits are stored in the present invention per pixel rather than 24 as in the prior art. Thus, unlike the prior art, the well known techniques of dither and FRC are performed at the front end of the system rather than after the data is stored.

Preferably, before the dither circuit 306 reduces the number of bits for each color, the least significant 2 bits are removed, leaving 6 bits. Then, the dither circuit 306 reduces the number of bits for each color from 6 bits to 4 bits. The FRC circuit 308 then reduces the number of stored bits for each color from 4 bits to 1 bit. It will be apparent, however, that a different number of bits could remain after each of these operations and that these operations could be performed in another order.

As a result of compressing the data before, rather than after, storing the data in the video frame memory 104, fewer circuits are required to support both STN and TFT flat panel displays and a smaller video frame memory 104 is required than otherwise, while maintaining display quality (e.g. the number of displayed colors and refresh rates are kept high). This is true because less data is required to be processed and stored once it has been compressed. Accordingly, the amount of storage required in the video frame memory 104 is reduced by up to a factor of eight without degrading image quality, in comparison to performing dither and FRC after reading the data out of the video frame memory 104. For example, for an SVGA flat panel display monitor, the video frame memory 104 can be 800×600×3 bits, and for an XGA flat panel display monitor, the video frame memory 104 can be 1024×768×3 bits.

The RGB video signals received by the analog-to-digital converters 202, 204 and 206 can vary in resolution from 640×350 pixels up to 1024×768 pixels, while the resolution of the flat panel display monitor 108 is fixed, up to a maximum of 1024×768 pixels. When the incoming RGB video signals have a lower resolution than the resolution of the flat panel display monitor 108, the image would tend to occupy less than the entire image area of the flat panel display monitor 108. Therefore, the mode detect/capture active generation logic 316 of the controller 100 determines the format and, thus, the resolution of the incoming RGB video. If necessary based upon the detected format of the received ROB video signals and upon the available resolution of the flat panel display 108, the data latch/logic 312 expands the image in the horizontal direction. This is accomplished by replicating appropriate pixels as the image data is stored in the FIFO logic 314, thus, evenly spreading the image in the horizontal direction. The expansion block 320 receives data derived from the panel description registers 304 and from the mode detect logic 316 which indicates the amount of horizontal expansion required. The expansion block 320 also forms a REPEAT PIXEL signal which is coupled to the address generation logic 408 to indicate horizontal lines to be repeated for packing the lines in the frame memory 104.

Whereas conventional techniques merely place an image having a resolution that is lower than the maximum resolution of the flat panel display in the center of the flat panel display with large borders surrounding the image that have no image information, the expand function of the present invention expands such an image to fill the entire display area of the flat panel display. This results in an improved appearance of the displayed image.

The data latch/logic 312 performs several functions. First, the data latch/logic 312 generates a serial clock signal for reading data from the frame memory 104. Secondly, the data/latch logic 312 generates a shift clock for the flat panel display 108. Third, the data latch logic 312 performs pixel steering. Pixel steering is a process of reading the pixel data from the frame buffer memory 104 and delivering the pixel data to the flat panel display 108 in an appropriate format depending upon the type of flat panel. For example, for STN panels, 2¾ pixels or 4 pixels are delivered to the flat panel display per shift clock, whereas, for TFT panels, 1 or 2 pixels are delivered per shift clock. These functions coordinate the reading, rearranging and shifting out of the data.

To determine the scanning format and resolution of the incoming RGB video signals, the HSYNC and VSYNC signals are coupled to the mode detect/capture active generation logic circuit 316. The scanning format and resolution is detected by determining the polarity of the pulses of the HSYNC signal, the polarity of the pulses of the VSYNC signal and the number of horizontal lines per image. The HSYNC and VSYNC signals are either of positive polarity or negative polarity. A positive polarity signal will have a high voltage pulse of up 20 clock cycles and a low voltage period ranging from approximately 670 to 1040 clock cycles, depending upon the format. A negative polarity signal will have a low voltage pulse of up to 20 clock cycles and a high voltage period ranging from approximately 670 to 1040 clock cycles, depending upon the format. To determine the polarity of each of the HSYNC and VSYNC signals, a first counter increments for each clock cycle that a low voltage is detected for one period of the signal and a second counter increments for each clock cycle that a high voltage is detected. If the counter counting the clock cycles occurring during a low voltage has a value of less than 20, then a negative polarity is indicated. If the counter counting the clock cycles occurring during a high voltage has a value of less than 20, then a positive polarity is indicated.

The counters utilized to determine the polarity of the HSYNC signal are clocked according to a rate of incoming video pixels by the clock signal CLOCK, whereas the counters utilized to determine the polarity of the VSYNC signal are clocked according to the HSYNC pulses. This is because the HSYNC pulses occur many times during each video frame, whereas the VSYNC pulses occur only once per video frame.

If the polarities are both negative, then the format must be VGA, SVGA or XGA, since each of these formats generally utilize negative synchronizing signals. If both the HSYNC signal and the VSYNC signal have a negative polarity, the number of horizontal lines per image is required to determine the correct format. The number of horizontal lines per image is detected by counting a number of HSYNC pulses which occur between adjacent VSYNC pulses.

The number of horizontal lines is utilized to determine which of VGA, SVGA or XGA the format is because each has a unique number of horizontal lines per image. If the HSYNC and VSYNC pulses are not both negative, then based upon the polarities, a determination can be made as to whether the format is CGA or EGA. If the HSYNC and VSYNC signal both have a positive polarity, this indicates that the format has 350 horizontal lines. If the HSYNC signal has a negative polarity and the VSYNC signal has a positive polarity, this indicates that the format has 400 lines. Alternately, the number of pixels in each horizontal line can be determined to determine the format of the video signal. If the format does not conform to a standard format, then the user can program the adapter for the correct format by through the user interface. If the user does not do this, the adapter defaults to a standard format most similar to the actual format.

In addition, the incoming refresh rate is detected. This is accomplished by counting the number of cycles of the clock signal CLOCK which occur between adjacent HSYNC pulses. The display panel 108 can be refreshed either in sync with the incoming video or out of sync with the incoming video. In the synchronous operation, the adapter continuously monitors the incoming video refresh rate, and accordingly, varies the timing of signals to the display panel 108 to refresh the display panel 108 in sync with the incoming video.

Once the format and sync polarities are detected, the controller 100 determines the to number of dots (pixels) for each horizontal line and the number of lines in the vertical direction. The porch duration, however, is still unknown. For this reason a vertical adjust register and a horizontal adjust register are provided. The values stored in the vertical adjust register and the horizontal adjust register can be adjusted by the user through the user interface based upon the position of the displayed image. Generally, the user will adjust these values such that the displayed image is centered.

Based upon the HSYNC and VSYNC signals and values programmed in the panel description register 304 for the front porch and back porch, the mode detect/capture active generation logic 316 generates a CAPTURE ACTIVE VERTICAL signal and a CAPTURE ACTIVE HORIZONTAL signal. The CAPTURE ACTIVE VERTICAL signal and the CAPTURE ACTIVE HORIZONTAL signal are active high signals which determine the active region of the display monitor 108 for which data is to be captured. When both the CAPTURE ACTIVE VERTICAL signal and the CAPTURE ACTIVE HORIZONTAL signal are a logical high voltage, data from the data latch/logic 312 can be transferred into the FIFO logic 314.

The CAPTURE ACTIVE VERTICAL signal is generated in the following manner: Initially, the CAPTURE ACTIVE VERTICAL signal is a logical low voltage. A counter counting pulses of the HSYNC signal begins counting upon the occurrence of a VSYNC pulse. When the count value reaches the value stored in the vertical adjust register, the CAPTURE ACTIVE VERTICAL signal transitions to a logical high voltage, and the count value is reset to zero. When the count value reaches a value of 768, 600, 480, 400 or 350, as determined by the number of horizontal lines in the video format detected by the mode detect logic 316, the CAPTURE ACTIVE VERTICAL signal transitions to a logical low voltage until the next VSYNC pulse, when the cycle repeats.

The CAPTURE ACTIVE HORIZONTAL signal is generated in the following manner: Initially, the CAPTURE ACTIVE HORIZONTAL signal is a logical low voltage. A counter counting cycles of the clock signal CLOCK begins counting upon a HSYNC pulse. When the count value reaches the value stored in the horizontal adjust register, the CAPTURE ACTIVE HORIZONTAL signal transitions to a logical high voltage, and the count value is reset to zero. When the count value reaches a value of 1024, 800 or 640, as determined by the number of horizontal dots (pixels) in the video format detected by the mode detect logic 316, the CAPTURE ACTIVE HORIZONTAL signal transitions to a logical low voltage until the next HSYNC pulse, when the cycle repeats.

The FIFO logic 314 includes 32×54 bits of memory and control logic. Upon start up of the controller 100, a read address pointer and a write address pointer are pointing to the same address in the memory of the FIFO logic 314, indicating that the memory of the FIFO logic 314 is empty. When the memory of the FIFO logic 314 is empty, a FIFO EMPTY SIGNAL prevents any data from being read from the FIFO logic 314 into the video frame memory 104. The FIFO EMPTY signal is generated by the FIFO logic 314 and is input to the FIFO control logic 318.

Data is written into the memory of the FIFO logic 314 according to the write address pointer and the write clock signal, WRITE CLOCK. The write address pointer is incremented after each write cycle, such that the write address pointer points to a next address in the memory after each write cycle. The WRITE CLOCK is generated by the data formatting logic 416 from the clock signal, CLOCK, which is generated by the phase locked loop of the clock generator 112. Once data is written into the FIFO logic 314, the FIFO EMPTY SIGNAL is deactivated. This allows the FIFO control logic 318 to activate a PAGE MODE REQUEST signal to initiate the transfer of data from the FIFO logic 314 to the video frame memory 104. The WRITE CLOCK is active only when the CAPTURE ACTIVE VERTICAL and the CAPTURE ACTIVE HORIZONTAL signals are a logical high voltage.

The STOP PAGE MODE signal is coupled to the VRAM controller 404 which senses the STOP PAGE MODE signal to terminate an ongoing burst cycle. The STOP PAGE MODE signal is ignored during other cycles. The STOP PAGE MODE signal interrupts the page mode write cycles when: (1) any other requests for a frame memory 104 cycle occurs, such as a read transfer request, a split read transfer or a CBR refresh request; (2) a page miss occurs, i.e., the page has reached its boundary; or (3) the FIFO has been emptied, i.e., when the FIFO EMPTY signal goes high.

Data is read from the FIFO logic 314 into the video frame memory 104 according to a read address pointer and a read clock signal, READ CLOCK. The read address pointer is incremented after each read cycle such that the read address pointer points to a next address in the memory after each read cycle. The read clock is generated by the VRAM clock. The VRAM clock is generated from an external oscillator which operates at 50 Mhz.

The read and write address pointers are stored in a register which is reset/initialized by the system reset and are incremented based upon the READ CLOCK and the WRITE CLOCK, respectively. The data formatting logic 416 generates the READ CLOCK, while the VRAM controller 404 generates the WRITE CLOCK signal.

VIDEO DISPLAY

Figure 4:
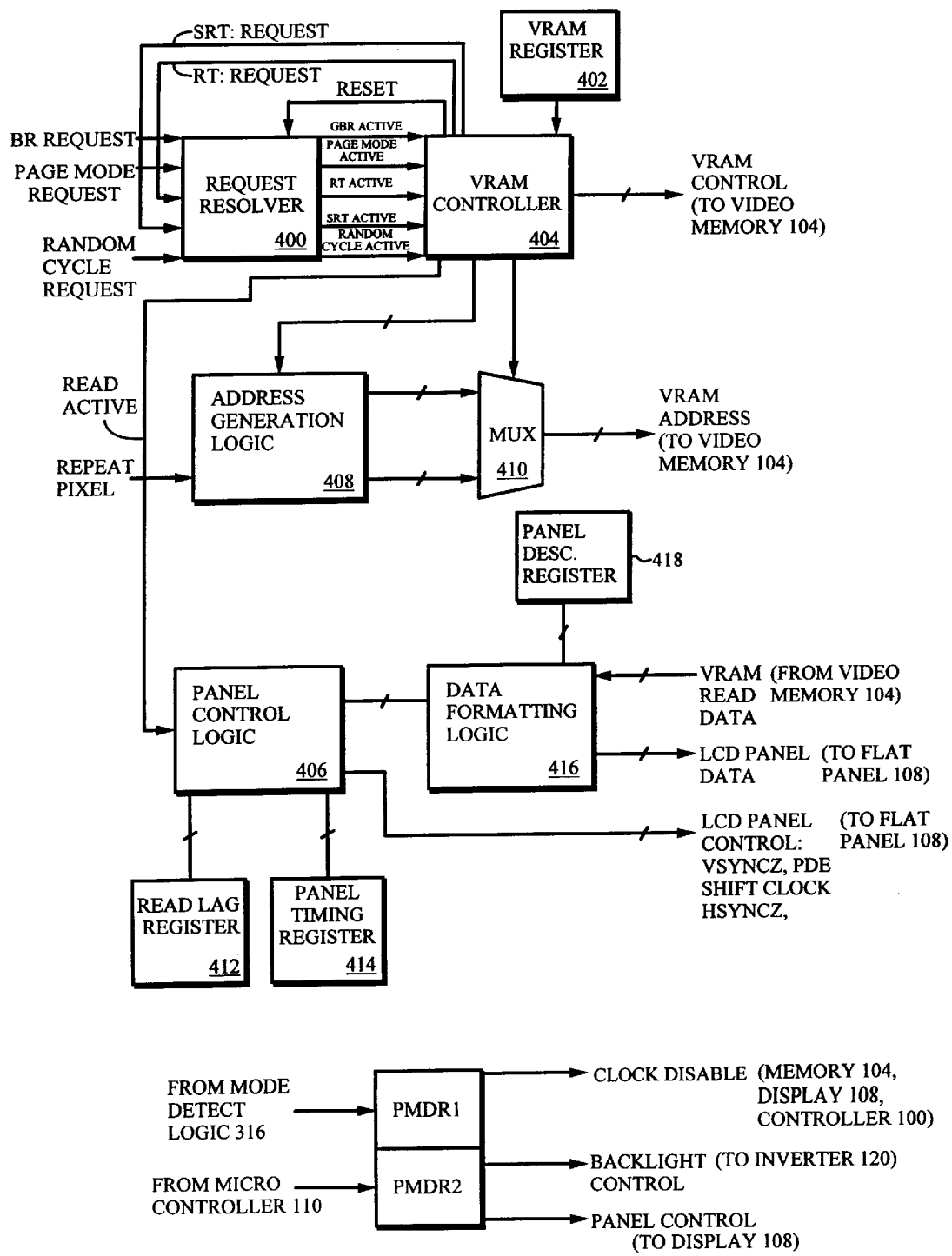
FIG. 4 illustrates a block schematic diagram of the display engine of the controller.

FIG. 4 illustrates a block schematic diagram of the display engine of the controller 100. The PAGE MODE REQUEST signal is coupled to the request resolver 400, along with a RT REQUEST signal (read transfer), a SRT REQUEST signal (split read transfer), a CBR REQUEST signal (column address strobe before row address strobe refresh) and a RANDOM CYCLE REQUEST.

The request resolver 400 resolves the request signals based upon the priority and status of other pending requests. The highest priority request is RT, followed by SRT, then RANDOM CYCLE, then CBR and, finally, PAGE MODE requests. The VRAM controller 404 generates appropriate control signals for the video frame memory 104 based upon the active request signals. Once a request has been serviced, the VRAM controller 404 resets the request resolver 400 via a RESET signal. Then, the request resolver services the next highest priority request.

The CBR REQUEST is generated by the mode detect logic 316 for refreshing the memory 104, since the memory 104 is preferably a dynamic memory requiring periodic refreshing. Two CBR REQUEST cycles are preferably activated during each HSYNC pulse so the memory 104 is refreshing during a time when data is not being written into the memory 104.

When the PAGE MODE REQUEST signal generates a PAGE MODE ACTIVE signal. The PAGE MODE ACTIVE signal is coupled to the VRAM controller 404. When the PAGE MODE ACTIVE signal is activated, this initiates a transfer of the data stored in the FIFO logic 314 into the video frame memory 104. Transfer of data from the FIFO logic 314 to the video frame memory 104 continues unless a higher priority request is received by the request resolver 400. If a higher priority request is received, the PAGE MODE ACTIVE signal will be deactivated while the higher priority request is being serviced.

For example, such a higher priority request is the RT REQUEST signal. The RT REQUEST signal signifies a request to read data from the shift register of the video frame memory 104 to the flat panel display monitor 108. The RT REQUEST is activated when the shift register is empty. When the RT REQUEST signal is the highest priority request pending, the request resolver 400 generates a RT ACTIVE signal. The RT ACTIVE signal is coupled to the VRAM controller 404 and to the panel control 406. While the VRAM controller 404 services a RT ACTIVE request by reading data from the video frame memory 104, data from the data latch/logic 312 is buffered by the FIFO logic 314. Once a frame of data from the shift register of the video frame memory 104 has been transferred to the flat panel display monitor 108, the RT ACTIVE signal is deactivated and the PAGE MODE ACTIVE signal is reactivated.

Alternately, when date in the shift register of the frame memory 104 is being transferred to the display monitor 108, the SRT REQUEST signal is activated. Preferably, this occurs when the shift register is half empty. This allows data to be read into the video frame memory 104 while data is in the process of being read out of the shift register of the frame memory 104.

The RANDOM CYCLE REQUEST provides an ability for the vram controller 404 to respond to occurrences requiring a memory cycle other than those listed above.

Values programmed in the VRAM register 402 control the timing of cycles initiated by the request resolver 400. For example, the row address strobe pre-charge and pulse widths, the column address strobe pre-charge and pulse widths, a row address strobe to column address strobe delay, are all programmable by changing the values stored in the VRAM register. The VRAM register 402 is initialized upon a system reset and its contents altered as needed by the micro controller 110.

The address generation logic 408 generates addresses utilized for reading data from, and for writing data to, the frame memory 104. The write address is generated based upon the CAPTURE ACTIVE VERTICAL signal, the CAPTURE ACTIVE HORIZONTAL signal and upon the row address strobe RAS signal for the frame memory 104 write cycles. The read address is generated based upon the HSYNC signal and the VSYNC signal for the display panel 108. The MUX 410 is switched depending upon whether the current cycle is a read cycle or a write cycle.

The panel control logic 406 generates control signals utilized for writing data from the video frame memory 104 to the flat panel display monitor 108. The control signals include a horizontal synchronizing signal HSYNC2, a vertical synchronizing signal VSYNC2, panel display enable PDE signal and a shift clock signal SHIFT CLOCK. The HSYNC2 accommodates the total number of horizontal pixels of the flat panel display 108, while the VSYNC2 signal accommodates the total number of vertical pixels (horizontal lines). The SHIFT CLOCK signal accommodates each pixel. The control signals are generated based upon values stored in the read lag register 412 and the panel timing register 414. For example, the VSYNC2 signal can be in phase or can be out of phase with the received VSYNC signal. The lag time between the VSYNC and VSYNC2 signals is controlled by a value stored in the lag time register. The registers 412, 414 are initialized by the micro controller 110.

The data formatting logic 416 receives data from the video frame memory 104 through the VRAM READ DATA signal and places the data LCD PANEL DATA into a format that is suitable for the flat panel display monitor 108 based upon values stored in the panel description register 418. The data is formatted by directing (muxing) the data from the video memory 104 to the appropriate panel data bits according to the requirements of the display monitor 108.

ON-SCREEN MENU

Figure 5:
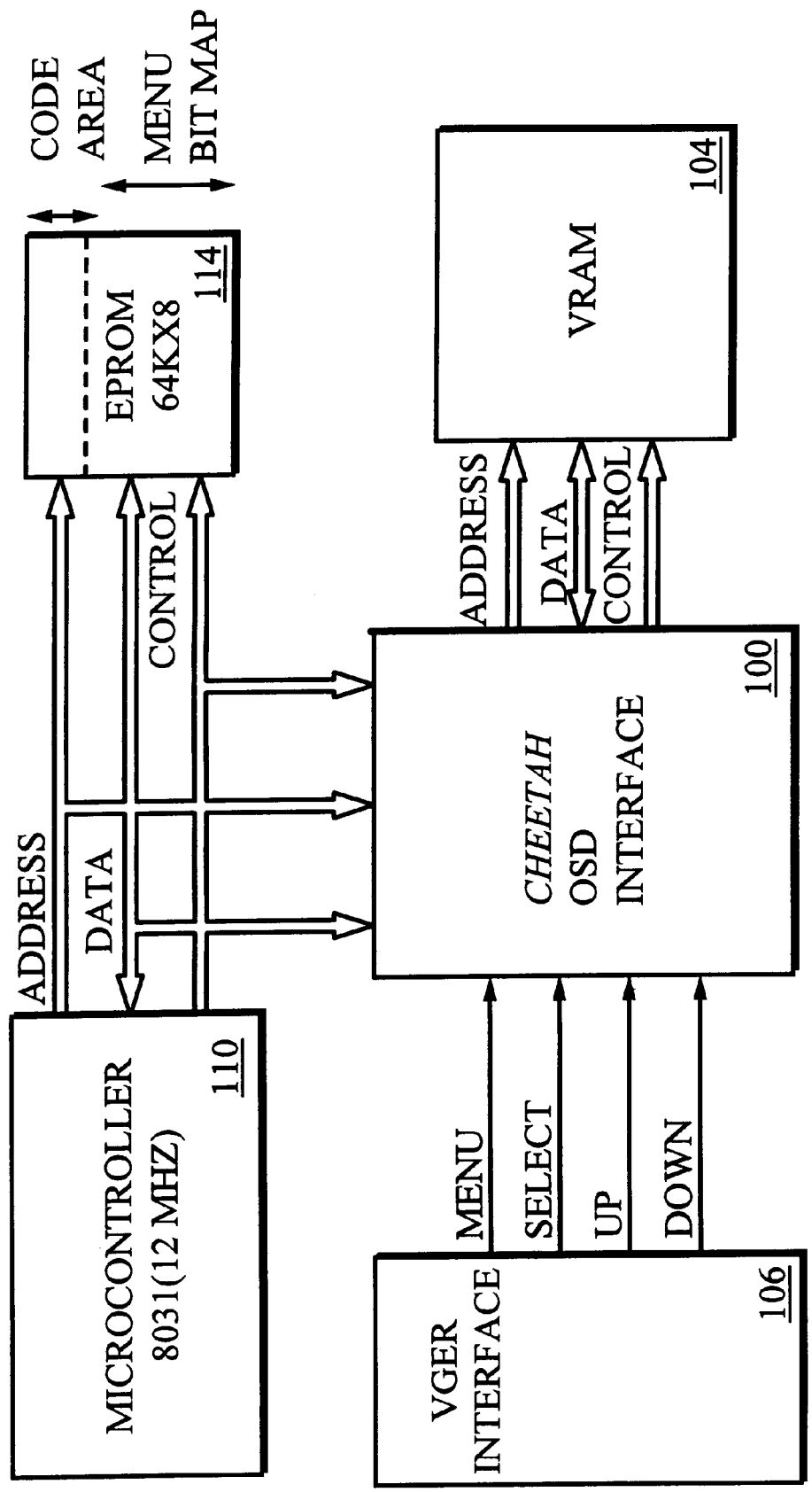
FIG. 5 illustrates a block schematic diagram of the micro controller block, memory and user interface.
Figure 6:
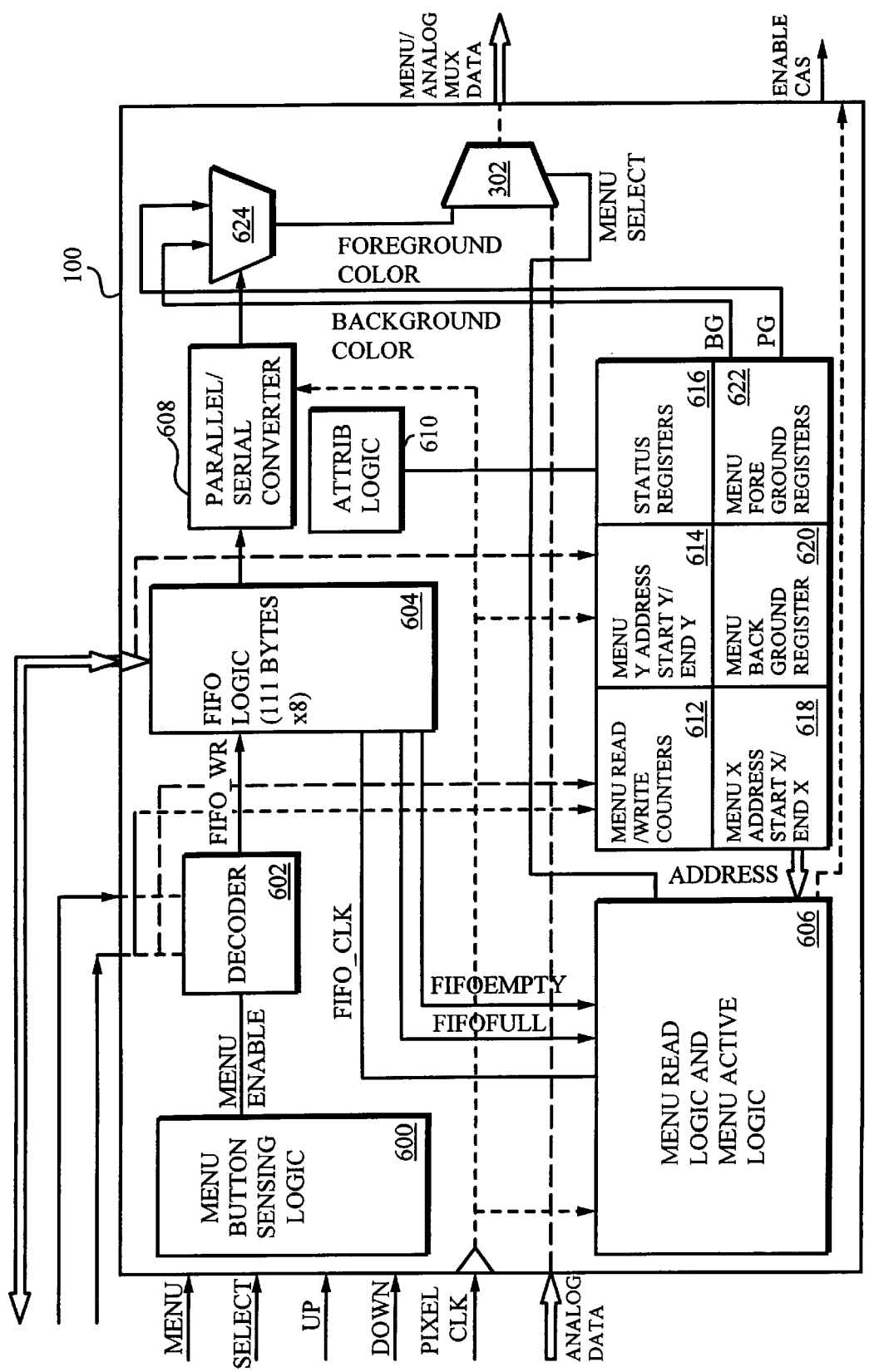
FIG. 6 illustrates a block schematic diagram of the on-screen menu display engine of the controller.

Another function of the micro controller 110 is to implement an on-screen menu interface. The on-screen menu interface displays characters and symbols in a menu which overlays the displayed video image and allows a user to adjust various parameters, such as the brightness and contrast of the displayed image, the horizontal and vertical position of the displayed image, the background and foreground colors of the on-screen menu display and the border color for the displayed image. FIG. 5 illustrates a block schematic diagram of the micro controller 110, the memory 114 and user interface 106. In addition to storing code for the on-screen menu display, the memory 114 stores bit maps for various fonts and languages for the on-screen menu display. FIG. 6 illustrates the on-screen menu display engine of the controller.

Referring to FIGS. 5 and 6, the user interface 106 includes four momentary-on push buttons. Menu button sensing logic 600 is coupled to each of the four buttons. When any one of the four buttons is pressed, the menu button sensing logic 600 indicates this by setting an appropriate bit in the status register 616. Once a button is pressed, further pressing of the button or one of the other buttons will have no effect until the bit is reset.

The user interface signals are designated MENU, SELECT, UP and DOWN. The MENU signal activates the on-screen menu display. Pressing the associated button once brings up the on-screen menu. Pressing the associated button a second time causes the on-screen menu display to disappear. The SELECT signal causes a menu item to be selected when the corresponding button is pressed. If a sub-menu corresponds to the selected item, activation of the SELECT signal will cause the sub-menu to be displayed. The UP signal allows a user to scroll up the menu items and to make adjustments. The DOWN signal allows the user to scroll down the menu items and to make adjustments. For example, if a menu item is selected by the SELECT signal and it does not have a sub-menu, such as "HORIZONTAL POSITION", then a bar will be displayed and activation of the UP or DOWN signal will move the image to the left or right. If a menu item "VERTICAL POSITION" is selected, then activating the UP or DOWN signal will move the image up or down. If "BRIGHTNESS" or "CONTRAST" is selected, the UP and DOWN signals will increment or decrement the selected adjustment.

Figure 7:
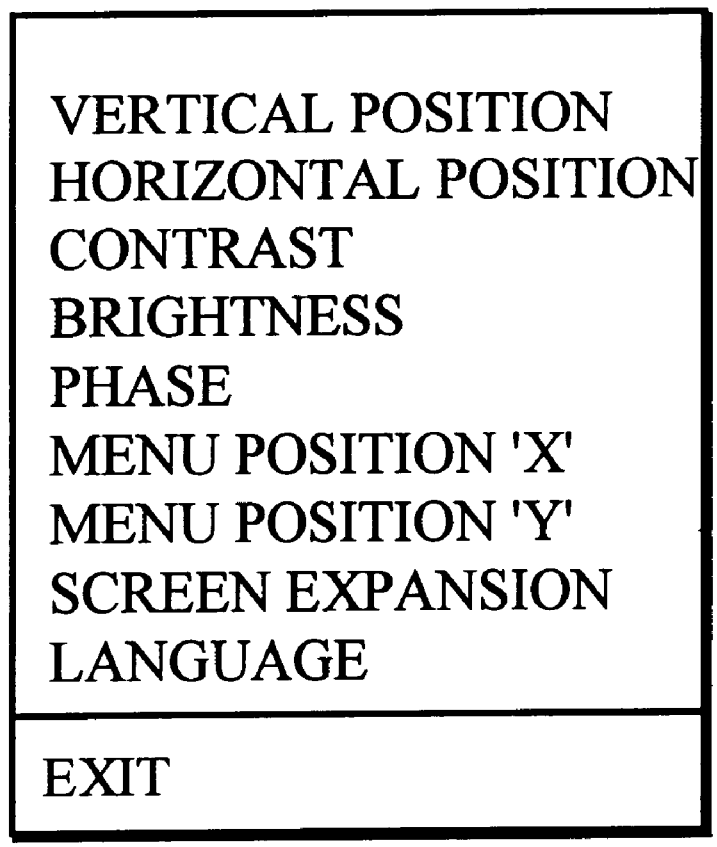
FIG. 7 illustrates an example of an on-screen menu displayed after the MENU button has been pressed.
Figure 8:
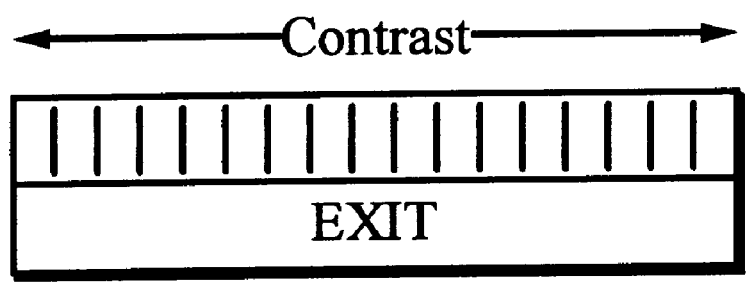
FIG. 8 illustrates an example of an on-screen menu displayed for adjusting the contrast of the displayed image.

FIG. 7 illustrates an example of an on-screen menu displayed after the MENU button has been pressed. FIG. 8 illustrates an example of an on-screen menu displayed for adjusting the contrast of the displayed image.

The micro controller 110 periodically polls the contents of the status register 616. Upon detecting that a status bit associated with the MENU signal has been set, the micro controller 110 creates a bit map for a top level of the on-screen menu display using firmware stored in the memory 114.

The micro controller 110 reads the on-screen display menu data from the EPROM of memory 114. The data is stored in character rows. Each character in a character row is represented by its one-byte ASCII code. Each character row has an associated attribute byte. Bits 0–1 of the attribute byte specify the foreground color to be used for the character row. Bits 2–3 of the attribute byte specify the background color to be used for the character row. Bits 4–7 of the attribute byte are reserved. The remaining bytes in each character row are used for storing the ASCII codes of characters to appear in the on-screen menu.

Assuming there are 24 characters in each row and a total of ten rows, the memory required for storing each on-screen display menu is 250 bytes (25 bytes×10 rows). Assuming thirteen different menus are utilized and that six different languages are supported, 19.5 Kbytes are required (250 bytes×13 menus×6 languages). It will be apparent that these numbers are exemplary only and that others can be utilized.

The micro controller 110 provides an indication to the controller 100 of the height and width of the on-screen display menu and where to place the menu on the display. This information is stored in the menu Y address start Y/end Y register 614 and in the menu X address start X/end X register 618. Preferably, the height and width of the menu is programmable by the user depending upon the size of fonts chosen. The micro controller 110 reads the character rows from memory 114 and converts them into a bit map for the controller 100.

The write counter located in the registers 612 indicates the address of the current scan line written into the FIFO buffer and logic 604. The read counter located in the registers 612 indicates the address of the current scan line read from the FIFO buffer and logic 604. At the start of displaying an on-screen display menu, the read counter and the write counter are initialized by the micro controller 110. For each write operation, the write counter is incremented by one. For each read operation, the read counter is incremented by one. Because scan lines are written to the FIFO buffer and logic 604 in groups of three, the write address will increment three times for each group of scan lines before the read address increments three times for the group of scan lines. The read and write counters allow the menu read/active logic 606 to keep track of the progression of transferring scan lines from the bit map to the flat panel display 108.

Figure 9:
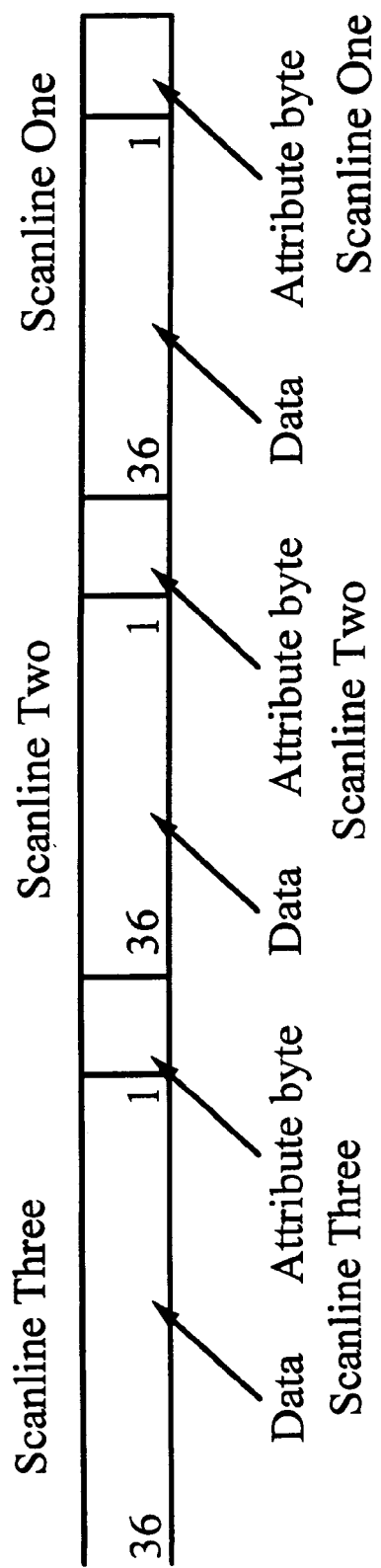
FIG. 9 illustrates a format for the three on-screen menu display scan lines stored in the FIFO buffer and logic.

When the MENU signal is activated, this also activates the decoder 602. The decoder 602 receives address and data from the micro controller 110 which are utilized to write the bit map into the FIFO buffer and logic 604 three scan lines at a time. FIG. 9 illustrates the storage format in the FIFO buffer and logic 604 for three on-screen menu display scan lines. The maximum width of each scan line is 36 bytes, though fewer can be stored, depending upon the width of the on-screen menu display and upon the font size, up to a maximum font size of 12×18. Therefore, the FIFO logic 604 is preferably sized to accommodate 111 bytes of data, corresponding to the three scan lines of 37 bytes each, which includes the attribute bytes. Under control of the decoder 602, the scan lines are written to the FIFO buffer and logic 604 from left to right, starting with the attribute byte of the first of the three scan lines.

After the three scan lines are loaded into the FIFO buffer and logic 604, the micro controller 110 sets a data_ready bit in the status register 616 to indicate that the three scan lines have been loaded into the FIFO buffer and logic 604. Once the data_ready bit is set, the data can be read out of the FIFO logic 604 under control of the menu read/menu active logic 606. When the menu X and Y start addresses matches the pixel count and line count (pixel=X, line=Y), the menu read/menu active logic 606 starts reading the data from the FIFO buffer and logic 604 into the parallel to serial converter 608.

As explained above, the first byte of each line is the attribute byte. This byte is loaded into the attribute logic 610. The attribute logic 610 programs the menu background register 620 and the menu foreground register 622 according to the indicated colors. The menu background register 620 and the menu foreground register 622 are each 12 bits wide and each specify four colors using three bits for each color. Therefore, each register is divided into four three-bit segments where each segment specifies a color. In each segment of three bits, one bit is reserved to specify red, green, and blue shades and the remaining bits are zeros. Therefore, this provides an ability to specify four different colors for each of the background and the foreground.

The multiplexer 624 is controlled by the menu read/active logic 606 to select menu character bits from the parallel to serial converter 608, background color bits from the background register 620 or foreground color bits from the foreground register 622. The selected menu display data is routed to the multiplexer 302 (also illustrated in FIG. 3) along with image data from the video frame memory 104. The multiplexer 302 is also controlled by the menu read/active 606 to select menu data from the multiplexer 624 or image data from the video frame memory 104.

Once the three lines of data from the FIFO buffer and logic 604 are read, the data_ready bit is reset. The micro controller 110 polls this bit. When the data_ready bit is reset, the micro controller 110 loads the next three lines of the on-screen display menu bit map into the FIFO buffer and logic 604. The menu read/active logic 606 then waits until pixel count reaches the same value as for the previous three lines and the line count reaches a value that is three higher than for the previous three scan lines (pixel=X, line=Y+3) and begins writing the data from the FIFO buffer and logic 604 to the parallel to serial converter 608 as was done for the previous three scan lines. This process continues until the entire on-screen menu is displayed on the flat panel display monitor 108 as indicated by the current read address stored in the counters 612 being equal to the X and Y stop addresses stored in the registers 614 and 618.

Once the display data is written into the video frame memory 104, the locations in which this display data is located are prevented from being overwritten by incoming video data.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A method of providing a user interface for selectively adjusting display parameters of an image displayed by a digital display monitor wherein the image is obtained by forming digital samples of an analog video signal, storing the digital samples in a buffer memory and providing the digital samples to the digital display monitor, the method comprising steps of:

a. displaying a plurality of the display parameters in response to a first input from a user;

b. displaying a level for a selected display parameter of the plurality of the display parameters in response to a second input from the user;

c. selectively adjusting the selected display parameter in response to a third input from the user, this step comprising:

i. incrementing a first count value for each clock pulse of a clock signal occurring after a horizontal sync pulse associated with the analog video signal;

ii. comparing the first count value to a first value representative of the horizontal position;

iii. obtaining the digital samples after the count value is equal to the first value;

iv. comparing the first count value to a second value representative of a width of the digital image; and v. inhibiting the step of obtaining the digital samples after the first count value is equal to the second value; and d. displaying an adjusted digital image on the digital display monitor wherein the adjusted digital image corresponds to adjustments of the selected display parameter.

2. The method according to claim 1 wherein the plurality of parameters includes a horizontal position for the display image.

3. The method according to claim 2 wherein the step of displaying the adjusted digital image further comprises a step of displaying the digital samples that were obtained after the count value is equal to the first value and before the count value is equal to the second value.

4. The method according to claim 1 wherein the plurality of parameters includes a vertical position for the display image.

5. The method according to claim 4 wherein the step of displaying the adjusted digital image further comprises a step of displaying the digital samples that were obtained after the count value is equal to the first value and before the count value is equal to the second value.

6. A method of providing a user interface for selectively adjusting display parameters of an image displayed by a digital display monitor wherein the image is obtained by forming digital samples of an analog video signal, storing the digital samples in a buffer memory and providing the digital samples to the digital display monitor, the method comprising steps of:

a. displaying a plurality of the display parameters in response to a first input from a user;

b. displaying a level for a selected display parameter of the plurality of the display parameters in response to a second input from the user;

c. selectively adjusting the selected display parameter in response to a third input from the user; and d. displaying an adjusted digital image on the digital display monitor wherein the adjusted digital image corresponds to adjustments of the selected display parameter, wherein the plurality of parameters includes a contrast of the image and wherein the step of selectively adjusting the selected parameter comprises a step of adjusting a dc offset applied to the analog video signal prior to forming the digital samples of the analog signal.

7. The method according to claim 1 wherein the plurality of parameters includes a contrast of the image.

8. An apparatus for adjusting parameters of an image displayed by a digital display monitor wherein the image is obtained by forming digital samples of an analog video signal, the apparatus comprising:

a. an amplifier coupled to receive the analog video signal for forming an amplified analog video signal;

b. an analog-to-digital converter coupled to the amplifier to receive the amplified analog video signal for forming a series of the digital samples;

c. a buffer memory coupled to the analog-to-digital converter and configured for storing the series of the digital samples and providing the series of the digital samples to the digital display monitor for forming the image on the digital display monitor;

d. an on-screen menu display engine for providing an on-screen menu to the digital display monitor by which a user selects a horizontal position for the image; and e. a capture engine for adjusting the horizontal position for the image comprising:

i. means for incrementing a count value for each clock pulse of a clock signal occurring after a horizontal sync pulse associated with the analog video signal;

ii. means for comparing the count value to a first value representative of the horizontal position;

iii. means for obtaining the digital samples after the count value is equal to the first value;

iv. means for comparing the count value to a second value representative of a width of the image; and v. means for inhibiting the step of obtaining the digital samples after the count value is equal to the second value.

9. The apparatus according to claim 8 wherein the analog video signal is formed by a personal computer for driving a CRT display.

10. An apparatus for adjusting parameters of an image displayed by a digital display monitor wherein the image is obtained by forming digital samples of an analog video signal, the apparatus comprising:

a. an amplifier coupled to receive the analog video signal for forming an amplified analog video signal;

b. an analog-to-digital converter coupled to the amplifier to receive the amplified analog video signal for forming a series of the digital samples;

c. a buffer memory coupled to the analog-to-digital converter and configured for storing the series of the digital samples and providing the series of the digital samples to the digital display monitor for forming the image on the digital display monitor;

d. an on-screen menu display engine for providing an on-screen menu to the digital display monitor by which a user selects a vertical position for the image; and e. a capture engine for adjusting the vertical position for the image comprising:

i. means for incrementing a count value for each horizontal sync pulse associated with the analog video signal occurring after a vertical sync pulse associated with the analog video signal;

ii. means for comparing the count value to a first value representative of the vertical position;

iii. means for obtaining the digital samples after the count value is equal to the first value;

iv. means for comparing the count value to a second value representative of a height of the image; and v. means for inhibiting the step of obtaining the digital samples after the count value is equal to the second value.

11. The apparatus according to claim 10 wherein the analog video signal is formed by a personal computer for driving a CRT display.

* * * * *

UNITED STATES PATENT AND TRADEMARK OFFICE
CERTIFICATE OF CORRECTION

PATENT NO.      : 6,195,079 B1
DATED           : February 27, 2001
INVENTOR(S)     : Chandra S. Reddy It is certified that error appears in the above-identified patent and that said Letters Patent is hereby corrected as shown below:

Title page,
Item [56], References Cited,
"FOREIGN PATENT DOCUMENTS", insert -- OTHER DOCUMENTS --.
"OTHER DOCUMENTS", insert -- "Extended Display Identification Data Programming of Microprocessor-Based Display Data Channel Design", IBM Technical Disclosure Bulletin, vol. 38, no. 03, page 169, March 1995 --.
"OTHER DOCUMENTS", insert -- Late-News Paper: Development of 13.3-in. Super TFT_LCD Monitor", N. Kasai, T. Furuhashi, H. Mano, et al., pp. 414-417, December 1996 --.
"OTHER DOCUMENTS", insert -- "An 11.8-in Flat Panel Display Monitor", Hodge, Foster, Kommrusch and Searby, Hewlett-Packard Journal, vol. 46, August 1995 --
"OTHER DOCUMENTS", insert -- "Designing the Optimal Flat Panel VGA Subsystem for the Portable PC", Velamuri and Seman, Wescon Conference Record, vol.36, pp. 519-524, November 1992 --.

Column 7,
Line 20, delete "ROB" and insert -- RGB --.
Line 50, delete "22/4" and insert -- 2 ⅔ --.

Column 8,
Line 41, delete "by" after "format".

Signed and Sealed this

Ninth Day of July, 2002

Attest:

Attesting Officer

JAMES E. ROGAN
Director of the United States Patent and Trademark Office